United States Patent [19]

Gorai et al.

[11] 4,091,074

[45] May 23, 1978

[54] METHOD FOR REGENERATING IRON-EDTA SOLUTIONS USED FOR SCRUBBING PLUG GASES

[75] Inventors: Tokio Gorai; Kunio Akiba, both of Chiba, Japan

[73] Assignee: Chisso Engineering Co. Ltd., Tokyo, Japan

[21] Appl. No.: 701,714

[22] Filed: Jul. 1, 1976

[30] Foreign Application Priority Data

Jan. 27, 1976 Japan .................................... 51-7823

[51] Int. Cl.$^2$ ............................................. C01B 21/00
[52] U.S. Cl. .................................... 423/235; 423/242; 423/243
[58] Field of Search ............... 423/235, 239, 242, 243, 423/351; 55/37, 68, 73

[56] References Cited

U.S. PATENT DOCUMENTS

| | | | |
|---|---|---|---|
| 3,329,478 | 7/1967 | Garlet et al. | 423/235 |
| 3,984,522 | 10/1976 | Saito et al. | 423/351 |
| 3,991,161 | 11/1976 | Saitoh et al. | 423/235 |
| 3,992,508 | 11/1970 | Saitoh et al. | 423/235 |
| 4,013,430 | 3/1977 | Adachi | 55/37 |

FOREIGN PATENT DOCUMENTS 1,251,900  10/1967  Germany .............................. 423/235

OTHER PUBLICATIONS

Chem. Abstr. – 85: 12986a.
Chem. Abstr. – 85: 12987o.

*Primary Examiner*—O. R. Vertiz
*Assistant Examiner*—Eugene T. Wheelock
*Attorney, Agent, or Firm*—Fred Philpitt

[57] ABSTRACT

A method for purifying industrial exhaust gases containing nitrogen oxides and sulfur oxides, by treating the gases with a circulating absorbing solution containing Fe-EDTA complex salt and ammonium sulfite is provided.

The treatment comprises a combination of the main absorbing step with the following steps:

(a) a circulation step of the absorbing solution in part or total, (b) an oxidation step of sulfite, (c) a separation step of EDTA, (d) a decomposition step of dithionate, etc., (e) a separation step of iron compound, and (f) a separation step of ammonium sulfate.

According to this invention, a long time continuous operation for said purification is possible.

7 Claims, No Drawings

METHOD FOR REGENERATING IRON-EDTA SOLUTIONS USED FOR SCRUBBING PLUG GASES

DESCRIPTION OF THE INVENTION

The present invention relates to a method for purifying industrial exhaust gases. More particularly it relates to a method for purifying industrial exhaust gases wherein nitrogen oxides and sulfur oxides are removed from industrial exhaust gases containing the same by means of an absorbing solution and these oxides are recovered in the form of ammonium sulfate, while the absorbing solution is regenerated and recirculated.

Combustion of sulfur-containing fuels such as coal, heavy oil, etc. in boiler or heating furnace has been carried out widely and commercially. In this case, however, exhaust gases containing harmful nitrogen oxides and sulfur oxides are formed. In order to prevent the air from pollution, it has been required for such exhaust gases (which will hereinafter be referred to as industrial exhaust gases) to remove harmful substances therefrom prior to discharging them into the air. When nitrogen oxides and sulfur oxides are coexistent in industrial exhaust gases, a method of removing them at the same time is most desirable. Among those, a method wherein industrial exhaust gases are treated with an aqueous solution containing a chelate complex salt of iron ion and EDTA (abbreviation of ethylenediaminetetraacetic acid) and a sulfite salt (which solution will hereinafter be abbreviated as absorbing solution), is superior in that nitrogen oxide (NO) existing usually in a largest amount among nitrogen oxides can be continuously and highly removed even in the presence of oxygen. This is disclosed in Japanese patent application laid-open No. 96478/1975 previously proposed by one of the present inventors. According to the method, since various compounds are formed with the fixation of sulfur oxides and nitrogen oxides in the absorbing solution and accumulated therein during a long time operation, it becomes necessary to remove them from the absorbing solution. In this case, nitrogen oxides are converted mainly into imidodisulfate and amidosulfate and accumulated in the solution, and for the case where ammonium sulfite is used as the above-mentioned sulfite, a method has been previously proposed by one of the present inventors, wherein the above-mentioned accumulated compounds are recovered as ammonium sulfate (Japanese patent application No. 129357/1974). Further, at the time of the absorption, a dithionate is also formed by the oxidation of sulfite, and a method wherein this dithionate is decomposed by heat to thereby prevent the accumulation of this salt in the absorbing solution and also recover sulfur dioxide, has been previously proposed by one of the present inventors (Japanese patent application No. 3986/1975). Besides these methods, a method wherein iron-EDTA complex salt or EDTA is separated and recovered from the absorbing solution has also been previously proposed by the present inventors (Japanese patent application No. 3987/1975).

The present inventors have made various studies for establishing a process for purifying industrial exhaust gases which enables to conduct a long time continuous operation, by combining the above-mentioned known or unknown prior arts together most effectively, and attained the present invention wherein steps (a), (b), (c) and (d) mentioned below are combined with new steps (e) and (f).

The first object of the present invention is to provide a method for effectively removing nitrogen oxides and sulfur oxides from industrial exhaust gases.

The second object of the present invention is to provide a method for converting various compounds formed and accumulated during the absorbing step of substances to be removed, into useful ammonium sulfate, and recovering the same.

The third object of the present invention is to provide a method for purifying industrial exhaust gases which enables to conduct a long time continuous operation, by effectively using through recirculation, EDTA or its iron salt and $SO_2$ in the absorbing solution system.

Other objects will be apparent from the description mentioned below.

The present invention resides in the following main method (1) containing indispensable requirements therefor, and further the following methods (2)–(6) relating to desirable embodiments to be added to the main method (1):

(1) In a method for purifying industrial exhaust gases containing nitrogen oxides and sulfur dioxide by treating the same with a circulating absorbing solution containing an iron EDTA complex salt and ammonium sulfite, the improvement which comprises the following steps (a)–(f):

(a) a circulation step of the absorbing solution comprising sending a part or the whole of the absorbing solution during the treatment, to the subsequent step (b) for treating the absorbing solution, and in place thereof, supplying a part or the whole of a fresh or regenerated absorbing solution or an absorbing solution treated in the subsequent steps (b)–(f), (b) an oxidation step of the sulfite contained in the absorbing solution treated in the step (a), comprising contacting the solution with oxygen or an oxygen-containing gas after concentration thereof or as it is, (c) a separation step comprising adding sulfuric acid to the absorbing solution treated in the step (b), to highly acidify the solution, and subsequently cooling the solution to crystallize EDTA from the solution, (d) a step comprising heating the absorbing solution treated in the step (c) to decompose dithionate, imidedisulfate, amidesulfate or the like, contained therein, (e) a step comprising neutralizing the absorbing solution treated in the step (d) with ammonia to precipitate and separate an iron compound, and (f) a step comprising concentrating the absorbing solution treated in the step (e) to crystallize and separate ammonium sulfate;

(2) a method according to the above method (1) wherein a solution prepared by dispersing and dissolving in water, the precipitates of EDTA obtained in said step (c) and the iron compound obtained in said step (e), is supplied as the absorbing solution;

(3) a method according to the method (1) wherein a $SO_2$— containing gas generated in said steps (b), (c) and (d) is treated with the absorbing solution of said step (a);

(4) a method according to the method (1) wherein a $SO_2$— containing gas generated in said steps (b), (c) and (d) is treated with ammonia and the resulting solution is used as a supplementary solution in said step (a);

(5) a method according to the method (1) wherein ammonia is added to the absorbing solution to maintain its pH at 5.5–7; and (6) a method according to the method (1) wherein the concentrated mother solution obtained in said step (f) is used as a supplementary solution in said steps (c) or (d).

The iron EDTA chelate complex salt referred to herein means a complex salt formed by combination of one mol of an iron ion with one mol of EDTA by coordination. The ammonium sulfite referred to herein includes also those in the form of ammonium hydrogen sulfite or ammonium pyrosulfite. The absorbing solution to be used in the circulation step of the absorbing solution is an aqueous solution containing iron EDTA chelate complex salt and ammonium sulfite, and also those in which ammonium sulfate, ammonium imidodisulfate, ammonium dithionate or the like or mixtures thereof formed during the treating process of industrial exhaust gases are dissolved. The concentration of iron EDTA chelate complex salt and that of ammonium sulfite are preferably 0.1–10% by weight and 2–30% by weight, respectively. Since the pH of the absorbing solution is reduced by absorption of $SO_2$, ammonia is supplied to maintain the pH at preferably about 5.5–7.

As for the apparatus for treating industrial exhaust gases with the absorbing solution to be employed in the present invention, conventional gas-liquid contact apparatuses, preferably e.g. packing tower, plate tower, bubble tower, wetted-wall tower, spray tower, etc. may be employed, and industrial exhaust gases are continuously contacted with the absorbing solution. The most part of the absorbing solution is circulated for use.

As for the temperature and pressure at the time of the treatment, conventional treating conditions for exhaust gases may be sufficient. For boiler exhaust gases, the temperature and pressure are usually 50° – 70° C and the atmospheric pressure to 1 Kg/cm$^2$ G, respectively.

The amount of the absorbing solution to be sent from the step (a) to the step (b) is proportional to the amount of $SO_2$ absorbed from industrial exhaust gases, but, from another viewpoint, a method wherein 1–10% of the total amount of the absorbing solution circulated is treated is easy to carry out.

As for the withdrawn absorbing solution, it is preferable for the convenience of the subsequent step to subject the solution to a concentrating operation within the salting-out limit of salts contained therein relative to their saturated concentration, but, if the concentration is already in the vicinity of the salting-out limit at the time of salting-out, the above concentrating operation is unnecessary.

As for the oxidation of the sulfite contained in the absorbing solution by contacting the solution with an oxygen-containing gas in the step (b), the oxidation may be carried out according to conventional method, for example, using air as the oxygen-containing gas, under a pressure of the atmospheric one to 10 atm, at a temperature of room temperature to 100° C and employing bubble tower, gas-liquid-stirring vessel or the like.

The amount of sulfuric acid added in the step (c) is so adjusted that the content of free acid in the solution after the addition may be 0.1–10 mol hydrogen ion/liter. The content is preferably 0.5–2 mol hydrogen ion/liter.

If sulfite still remains in the absorbing solution treated in the step (b) and withdrawn therefrom, it is preferable from the viewpoint of the improvement in separation efficiency, etc. to add acid to the solution and then subjecting it to such a treatment as air blowing, thereby to drive off free $SO_2$ from the solution.

Cooling of the absorbing solution thus treated is carried out at a temperature of from the freezing point of the solution to room temperature, using a conventional cooler such as shell tube type. A range of 5° C to −10° C is preferable. EDTA crystallized from the treated absorbing solution by the cooling is separated by means of conventional solid-liquid separating apparatus such as filter, centrifuge, etc.

The decomposition of dithionate by heating in the step (d) may be carried out a temperature of 100° C or higher. In this case, a long time is required at a relatively low temperature such as 100° C, while undesirable side reactions increase at a high temperature such as 200° C. Thus the decomposition is carried out usually at a temperature of 120° –140° C for a period of 1–5 hours in a pressurized vessel. During this operation if the pressure within the vessel exceeds the steam pressure of the solution due to $SO_2$ generated, gas is suitably discharged to maintain the pressure in the vicinity of the steam pressure. The gas discharged at that time and a gas generated when the pressure of treated solution is dropped to the atmospheric pressure, are combined and treated with the absorbing solution of the above-mentioned step (a), according to the embodiment (3).

On the other hand, the neutralization of the treated absorbing solution in the step (e) is carried out by adding aqueous ammonia or preferably by blowing gaseous ammonia directly into the treated absorbing solution. During or before or after the neutralization, an oxidization treatment by means of e.g. air-blowing-in is carried out to convert at least a part of the iron contained in the solution into $Fe^{III}$. This is effective for completing the precipitation and separation of iron. The neutralization is carried out usually at a temperature of room temperature to the boiling point of the treated solution and under the atmospheric pressure. The precipitation and separation of the trivalent iron compound is carried out usually using a separating means such as centrifuge.

The crystallization and separation of ammonium sulfate in the step (f) is carried out using a conventional evaporation-concentration-crystallization-separation apparatus for salts. Since EDTA and $Fe^{III}$ compound have been already separated in the step (c) and the step (f), respectively, the resulting ammonium sulfate contains only an extremely small amount of impurities precipitated together with the sulfate. The recirculation of the solution thus separated, i.e. a concentrated mother solution, is carried out usually by admixing the solution with the main treated solution, just before the step (d) or the step (c).

The re-dissolution of and the chelate complex salt formation from the precipitates of EDTA and iron compound in the embodiment (2) of the present invention is effected usually by dispersing and stirring the both in water at the same time. Alternatively it is possible to dissolve EDTA in aqueous ammonia and separately dissolve the precipitate of iron compound in sulfuric acid or sulfurous acid, and mix together the resulting solutions. The solution thus obtained is fed so as to supplement the amount of the absorbing solution withdrawn in the step (a). The amounts of EDTA and iron compound lost are supplemented by adding fresh materials in admixture with recovered materials at the time of dissolution in the embodiment (2) of the present invention. In this case, ferrous sulfate is usually employed for supplementing the amount of iron compound lost.

The treatment with aqueous ammonia in the embodiment (4) of the present invention is carried out using a conventional gas-liquid contact apparatus such as packing tower.

With regard to the embodiments (5) and (6) of the present invention, no particular description will be necessary.

Any of the above-mentioned steps and/or any of the embodiments can be usually carried out by continuous operation, but they may be also carried out by batch operation.

The constitutions and effectivenesses of the present invention comprising the combination of the above-mentioned steps and the above-mentioned embodiments will be mentioned below.

The fixing reaction of nitrogen oxides and sulfur oxides in the absorbing solution in the above-mentioned step (a) is summarily expressed by the following formulas (1) and (2):

$$SO_2 + (NH_4)_2SO_3 + H_2O \rightarrow 2(NH_4)HSO_3 \quad (1)$$

$$NO + 3(NH_4)HSO_3 \rightarrow NH(SO_3NH_4)_2 + \tfrac{1}{2}(NH_4)_2S_2O_6 + H_2O \quad (2)$$

Iron EDTA chelate complex salt promotes the reaction of the above formula (2) catalytically, and at the same time allows the reaction of the following formula (3) to proceed depending upon the amount of oxygen contained in the exhaust gases. At the same time, the reaction of the following formula (4) also proceeds.

$$2(NH_4)HSO_3 + \tfrac{1}{2}O_2 \rightarrow (NH_4)_2S_2O_6 + H_2O \quad (3)$$

$$(NH_4)_2SO_3 + \tfrac{1}{2}O_2 \rightarrow (NH_4)_2SO_4 \quad (4)$$

Ammonium hydrogen sulfite formed in the absorption reaction of $SO_2$ of the formula (1) is regenerated into ammonium sulfite by adding ammonia.

$$(NH_4)HSO_3 + NH_3 \rightarrow (NH_4)_2SO_3 \quad (5)$$

Namely, the absorbing solution withdrawn in the step (a) contains iron EDTA chelate complex salt, ammonium sulfite, ammonium hydrogen sulfite and besides, ammonium sulfate, ammonium dithionate, ammonium imidodisulfate, etc. Among them, ammonium sulfite and ammonium hydrogen sulfite are converted into ammonium sulfate and ammonium dithionate as seen in the reaction formulas (3) and (4), by the treatment of the step (b). Ammonium dithionate is decomposed into $SO_2$ and ammonium sulfate as seen in the following formula, by the treatment of the step (d) in an acidic state of sulfuric acid.

$$(NH_4)_2S_2O_6 \xrightarrow{(H_2SO_4)} (NH_4)_2SO_4 + SO_2 \quad (6)$$

In this case, ammonium imidodisulfate is also hydrolyzed into ammonium sulfate and ammonium hydrogen sulfate via amidesulfate or its salt.

$$NH(SO_3NH_4)_2 + H_2O \rightarrow NH_2SO_3H + (NH_4)_2SO_4 \quad (7)$$

$$NH_2SO_3H + H_2O \xrightarrow{(H_2SO_4)} (NH_4)HSO_4 \quad (8)$$

Ammonium hydrogen sulfate and sulfuric acid added in the step (c) are converted into ammonium sulfate at the time of neutralization with ammonia in the step (e).

$$H_2SO_4 \xrightarrow{+NH_3} (NH_4)HSO_4 \xrightarrow{+NH_3} (NH_4)_2SO_4 \quad (9)$$

Thus, various intermediate compounds contained in the treated absorbing solution can be converted into ammonium sulfate and $SO_2$. This $SO_2$ supplements the sulfurous acid which is recirculated to the circulation step of the absorbing solution (a) according to the embodiment (4) of the present invention and consumed in the reactions of the above-mentioned formulas (2), (3) and (4).

Namely, if industrial exhaust gases contain a small amount of $SO_2$ and a large amount of oxygen, it may occur that the concentration of ammonium sulfite or ammonium hydrogen sulfite sufficient for allowing the reaction of the formula (2) to proceed cannot be maintained. In this case, however, such reaction of the formula (2) can be allowed to proceed by incompletely carrying out the oxidation of the step (b) and recirculating $SO_2$ formed according to the reaction of the following formula (10) at the time of adding sulfuric acid in the step (c), to the circulation step of the absorbing solution (a), according to the embodiment (3) of the present invention.

$$2(NH_4)HSO_3 + H_2SO_4 \rightarrow (NH_4)_2SO_4 + 2H_2O + 2SO_2 \quad (10).$$

EDTA contained in the treated absorbing solution is in the form of stable complex salt, but this salt, as it is, will be partly decomposed and lost at the time of the treatment at a high temperature in an acidic state in the step (d). Such loss of EDTA, however, can be avoided by carrying out the step (c) prior to the step (d), because, by the cooling in a highly acidic state of sulfuric acid, iron EDTA chelate complex salt is decomposed and the resulting free EDTA is crystallized.

The fact that addition of sulfuric acid to the system is necessary in the present process may be regarded as a problem in the process, but, since the addition serves effectively to the separation of EDTA, the decomposition of intermediate compounds such as dithionate, and further the recovery of $SO_2$, due to the combination of the above-mentioned steps, as mentioned above, and sulfuric acid added is recovered as ammonium sulfate, no loss of sulfuric acid occurs.

Iron EDTA chelate complex salt is water-soluble, and it may be considered that the salt is attached onto ammonium sulfate at the time of its crystallization and lost, but, since the neutralization of the solution after separation of EDTA enables to precipitate and remove iron compound completely, as mentioned above, contamination of ammonium sulfate separated in the step (f), by such compound, and also loss of iron used for the absorbing solution can be prevented.

When the absorbing solution is concentrated and ammonium sulfate is crystallized in the step (f), ammonium dithionate left behind without being decomposed in the step (d) and contained in this solution, is concentrated. Thus, a part of the resulting concentrated solution is withdrawn and returned to the step (d), but, alternatively it may be again returned to the step (c). However, recirculation of it to the step (a) is usually undesirable, since the amount of the absorbing solution withdrawn in the step (a) is increased.

The constitutions and effectivenesses of the present invention have been mentioned above in detail. Now the effectivenesses will be summarized as follows:

(1) According to a mere combination of the inventions of the prior patent applications (Japanese patent applications Nos. 3986/1975 and 3987/1975), it is impossible to effectively utilize recovered EDTA or recovered $SO_2$, whereas according to the present invention, this is possible, and thereby it is possible to circulate iron EDTA complex salt or ammonium sulfite for reuse.

(2) By the neutralization with ammonia, of the treated absorbing solution after thermal decomposition of dithionic acid, it is possible to separate, recover and reuse iron compound after separation of iron compound.

(3) Further, by the separation and recovery of the above-mentioned iron compound, the purity of ammonium sulfate recovered from the absorbing solution subsequently treated is improved.

(4) By the reaction - dissolution of recovered EDTA and recovered iron compound, it is possible to substantially regenerate iron EDTA complex salt and use the regenerated salt for the regenerated absorbing solution.

(5) Further, it is possible to collect $SO_2$ generated in the steps of the concentration and oxidation of treated absorbing solution (step (b)), the separation of EDTA from iron EDTA complex salt by cooling the concentrated solution in a highly acidic state (step (c)) and the decomposition of dithionate, etc. by heating the separated solution of EDTA, etc. (step (d)), and subsequently supply the $SO_2$, under a suitable distribution, to any one of the treatment step of industrial exhaust gases (step (a)), the step (b), the step (c) or the step (d), or use the $SO_2$ for the preparation of ammonium sulfite described above in (1).

As seen from the foregoing, a method for purifying industrial exhaust gases which enables to carry out a long time continuous operation, has been achieved according to the present invention, by substantially including any of the inventions of the prior patent applications (Japanese patent application laid-open No. 96478/1975, Japanese patent applications Nos. 129357/1974, 3986/1975 and 3987/1975) and making the most thereof, and at the same time combining them newly with the constituting requirements of inventions relative to separation of iron compound and regeneration of the absorbing solution, effective circulation of generated $SO_2$ and suitable recovery of by-produced ammonium sulfate. As mentioned above, the present invention resides in a method for purifying exhaust gases, which has superior effectivenesses.

The method of the present invention will be further illustrated by way of the following non-limitative Example.

EXAMPLE

Two hundred $Nm^3/H$ (based on dry gas) of a boiler exhaust gas having a composition mentioned below and a temperature of 60° C was continuously fed into a plate tower having an inner diameter of 200 mm and a height of 10 m, at the lower part thereof, and contacted with an absorbing solution contained in the tower and having a temperature of 60° C in counter flow manner, and then discharged from the upper part of the tower into the atmosphere. The composition of the resulting purified gas discharged was as follows:

| Component | Boiler exhaust gas before treatment | Purified gas after treatment | Percentage removal |
|---|---|---|---|
| $SO_2$ | 1,700 ppm | 20 ppm | 98.8% |
| NO | 250 ppm | 70 ppm | 72.0% |
| $CO_2$ | 13.0% | 13.0% | — |
| $O_2$ | 4.0% | 4.0% | — |
| $N_2$ | 82.8% | 83.0% | — |
| Moisture | saturated | saturated | — |

The absorbing solution was maintained within the tower and the circulating system thereof in an amount of about 200 l and circulated at a rate of 800 l/H. The pH of the solution was maintained at 6.2 – 6.5 by supplying aqueous ammonia. The solution was withdrawn at a rate of 13 l/H from the absorbing solution to be circulated, and continuously fed to a concentrating vessel. The composition of the absorbing solution withdrawn was as follows:

ammonium sulfite and ammonium hydrogen sulfite . . . each, 0.5 mol/l
other sulfur compounds . . . 1.3 mol-sulfur/l
iron EDTA chelate complex salt . . . 0.08 mol/l The solution was concentrated to 2.5 times the original concentration by indirect steam heating in the concentrating vessel and then transferred to an oxidizing vessel, where a pressurized air under 10 $Kg/cm^2$ was blown thereinto to oxidize the most part of ammonium sulfite and ammonium hydrogen sulfite. The oxidizing vessel was maintained at a temperature of about 80° C by cooling. To the solution withdrawn from the oxidizing vessel was added concentrated sulfuric acid at a rate of 570 g/H under the atmospheric pressure, and they were mixed together. Air was blown into the resulting mixture to drive away $SO_2$. The absorbing solution thus treated was fed to a cooling and crystallizing vessel, where the solution was cooled to 0° C by indirect cooling by means of cooling medium. Cooling was carried out with stirring for 2 hours and the resulting crystallized EDTA was separated by filtration. The solid thus separated contained EDTA at a rate of 300 g/H. The filtrate obtained above, i.e., the treated absorbing solution, was sent to an autoclave of 30 l capacity, where the solution was retained and reacted for average 4 hours at 120° C. Generated gas was withdrawn so as to maintain the inner pressure of the autoclave under about 2 $Kg/cm^2$. This gas was combined with air discharged from the oxidizing vessel, exhaust gas of blown air after addition of sulfuric acid and exhaust gas of blown air after discharged from the autoclave, and fed into the lower part of the above-mentioned absorbing tower (plate tower) to recover $SO_2$ contained therein. No ammonium imidodisulfate nor ammonium amidosulfate was detected from the solution withdrawn from the atuoclave. The content of ammonium dithionate therein was less than 0.5 mol/l. Almost the same amount of solution as that of the solution supplied was withdrawn from the autoclave to maintain the amount of the solution retained therein at a constant one. Air was blown into the withdrawn solution to drive away $SO_2$ contained therein and also oxidize a part of iron compound. Gaseous ammonium was blown into the resulting solution, followed by neutralization to a pH of about 7. The resulting precipitated iron compound at a rate of about 100 g/H was separated from the solution by means of a centrifuge. The resulting solution was fed to a concentrating and crystallizing vessel, where the solution was continuously heated to vaporize water contained therein. The resulting crystallized ammonium sulfate was separated from the mother solution while hot by filtration. Ammonium sulfate was obtained at a rate of about 2.5 Kg/H. The mother solution was circulated to the concentrating and crystallizing vessel, while a part of the solution (about 1l/H) was combined with the solution to be fed into the autoclave, and the resulting concentrated ammonium dithionate was subjected to re-decomposition treatment. Three hundred g/H of EDTA obtained by cooling and crystallizing treatment and iron compound obtained by centrifuge were sent to a dissolving vessel, where they were suspended in about 5 l/H of water and heated to 80° C. The resulting solution was transferred to a supplying vessel each day, and continuously fed therefrom into the circulating solution of the absorbing tower, whereby the catalyst lost from the circulating solution of the absorbing tower, by withdrawal therefrom was supplemented.

The above-mentioned operation was continued for 2 weeks, and there was no change in the performance of gas purification, the amount of ammonium sulfate recovered, etc.

What is claimed is:

1. In the known method which comprises contacting industrial exhaust gases containing nitrogen oxides and sulfur dioxide in an absorption zone with a circulating flow of absorbing solution containing an iron EDTA complex salt and ammonium sulfite, said absorption zone being maintained under conditions whereby said absorbing solution will absorb nitrogen oxides and sulfur dioxide from said exhaust gases, the improvement in the method of treating said absorbing solution which comprises:
   (a) withdrawing absorbing solution from said absorption zone and supplying make-up absorbing solution to said absorption zone to take the place of the removed absorbing solution,
   (b) contacting at least a portion of said withdrawn absorbing solution with an oxygen-containing gas in an oxidation zone to thereby generate a $SO_2$-containing gas,
   (c) contacting the absorbing solution removed from said oxidation zone with sulfuric acid to thereby acidify the solution and generate a $SO_2$-containing gas, cooling the thus acid-treated absorbing solution to crystallize EDTA, and then separating the crystallized EDTA from the cooled absorbent solution,
   (d) heating the absorbent solution resulting from step (c) to thereby decompose the dithionate, imidodisulfate, and amidosulfate contained therein and to generate a $SO_2$-containing gas,
   (e) contacting the solution obtained from step (d) with ammonia to thereby precipitate an iron compound, and then separating said iron compound from the treated solution,
   (f) concentrating the solution resulting from step (e), crystallizing ammonium sulfate from the concentrated solution, and separating the crystallized ammonium sulfate from its mother liquor,
   (g) dispersing and dissolving in water both the crystallized EDTA separated in step (c) and the iron compound separated from step (e) and incorporating said water solution and dispersion into the make-up absorbing solution set forth in step (a),
   (h) conducting the $SO_2$-containing gas resulting from steps (b), (c) and (d) to a zone for the preparation of said make-up solution,
   (i) introducing an aqueous ammonia solution into the zone for producing said make-up absorbent solution so as to maintain the pH of the absorbing solution between 5.5 and 7, and
   (j) adding the mother liquor from step (f) to the solution obtained after the oxidation in accordance with step (b) and introducing the mixture into step (c).

2. In the known method which comprises contacting industrial exhaust gases containing nitrogen oxides and sulfur dioxide in an absorption zone with a circulating flow of absorbing solution containing an iron EDTA complex salt and ammonium sulfite, said absorption zone being maintained under conditions whereby said absorbing solution will absorb nitrogen oxides and sulfur dioxide from said exhaust gases, the improvement in the method of treating said absorbing solution which comprises:
   (a) withdrawing absorbing solution from said absorption zone and supplying make-up absorbing solution to said absorption zone to take the place of the removed absorbing solution,
   (b) contacting at least a portion of withdrawn absorbing solution with an oxygen-containing gas in an oxidation zone to thereby generate a $SO_2$-containing gas,
   (c) contacting the absorbing solution removed from said oxidation zone with sulfuric acid to thereby acidify the solution and generate a $SO_2$-containing gas, cooling the thus acid-treated absorbing solution to crystallize EDTA, and then separating the crystallized EDTA from the cooled absorbent solution,
   (d) heating the absorbent solution resulting from step (c) to thereby decompose the dithionate, imidodisulfate, and amidosulfate contained therein and to generate a $SO_2$-containing gas,
   (e) contacting the solution obtained from step (d) with ammonia to thereby precipitate an iron compound, and then separating said iron compound from the treated solution, and
   (f) concentrating the solution resulting from step (e), crystallizing ammonium sulfate from the concentrated solution, and separating the crystallized ammonium sulfate from its mother liquor
   (g) dissolving the crystallized EDTA separated in step (c) and the iron compound separated in step (e) in water and introducing the resultant solution into the make-up absorbing solution.

3. The method according to claim 2 wherein the $SO_2$-containing gas resulting from steps (b), (c) and (d) is introduced into a zone for the preparation of make-up absorbing solution.

4. The method according to claim 2 wherein the $SO_2$-containing gas resulting from steps (a), (b) and (c) is absorbed in an aqueous solution of ammonia and the resulting solution introduced into a zone for the preparation of make-up absorbing solution.

5. The method according to claim 2 wherein an aqueous ammonia solution is introduced into a zone for producing said make-up absorbent solution so as to maintain its pH within the range of 5.5 – 7.

6. The method according to claim 2 wherein the mother liquor of step (f) is added to the solution obtained after the oxidation in accordance with step (b) and the mixture introduced into step (c).

7. A method according to claim 2 wherein the mother liquor of step (f) is added to the solution resulting from step (c) after separation of the EDTA.

* * * * *